T. FRANKE.
APPARATUS FOR HEATING MATERIAL CONTAINING LIQUID.
APPLICATION FILED AUG. 29, 1913.
1,083,879.
Patented Jan. 6, 1914.
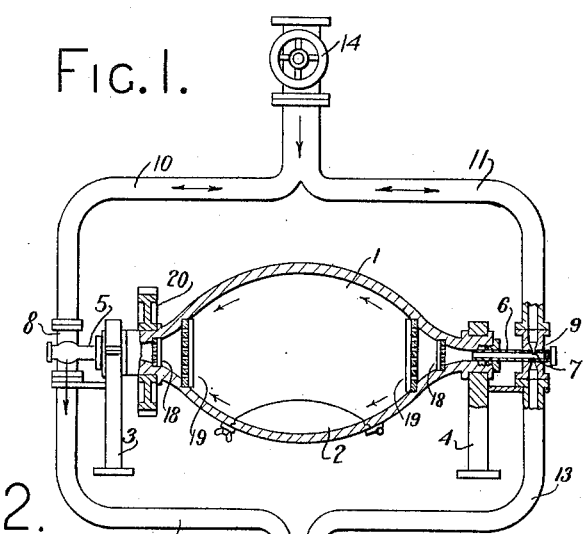
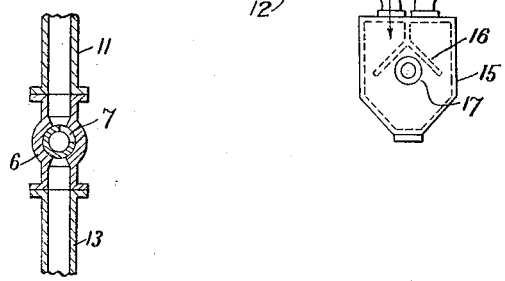
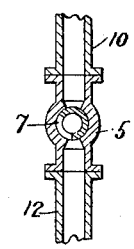

UNITED STATES PATENT OFFICE.

THEODOR FRANKE, OF LONDON, ENGLAND.

APPARATUS FOR HEATING MATERIAL CONTAINING LIQUID.

1,083,879. Specification of Letters Patent. Patented Jan. 6, 1914.

Application filed August 29, 1913. Serial No. 787,394.

*To all whom it may concern:*

Be it known that I, THEODOR FRANKE, a subject of the German Emperor, and residing at The London Frankett Works, 7 Steele road, Acton Green, London, W., England, have invented new and useful Improvements in Apparatus for Heating Material Containing Liquid, of which the following is a specification.

This invention relates to apparatus for heating in a vessel by means of steam or hot gases or vapors, material containing liquid; for heating peat, ooze, wood-pulp and the like contained in the vessel, the ultimate object in most cases being eventually to free the material from the liquid which it contains.

The invention is characterized by the direction of flow of the steam or hot gases being alternated or reversed from time to time in order that the action of the vapors or gases on the material may be much more intimate than would otherwise be the case. In addition to the alternation of the current of steam or hot gases the material may be more violently agitated, stirred, opened, or disintegrated while being heated, the vessel itself being rotated. The alternation of the current of steam or hot gases may be effected automatically by means interconnected with the vessel. The passages through which the steam or the like enters or leaves the vessel are each guarded by one or more perforated plates, sieves or permeable walls or the equivalent which allow the steam to pass but arrest the material operated upon.

Apparatus according to the present invention is illustrated in the accompanying drawings, in which:—

Figure 1 is a more or less diagrammatic part sectional front elevation of one form, Figs. 2 and 3 details of valves in this form.

Referring to the drawing, 1 is the vessel or digester into which the material to be heated is inserted through the hinged door 2 which can be very tightly closed. The vessel is substantially of the shape of a pear or of an ellipsoid of revolution and is revolubly supported in bearings on the standards 3, 4. The tubular ends of the vessel are provided with tubular extensions 5, 6 which are closed at their outer ends but which by being provided with openings 7 (see Figs. 2 and 3) serve as valves which coact with the valve-seats of the valve-castings 8, 9. With said castings the supply pipes 10, 11 are connected above and the exhaust pipes 12, 13 below. The pipes 10, 11 unite above and are connected to the main admission valve 14 and the pipes 12, 13 are connected below to the condenser 15 provided with the roof-shaped dirt-separator 16 situated above the outlet 17 for the condensed water. The vessel 1 is provided internally near its two ends with perforated walls or sieves 18, 19 and one end of the vessel is fitted with the toothed driving wheel 20. Said sieves are preferably readily removable.

The mode of operation is as follows:—
The material is inserted in the vessel 1 while the lid 2 is uppermost until the same is about two-thirds or three-quarters full and then the lid 2 is tightly closed. The valve 14 is then opened and the wheel 20 is driven. As the vessel 1 rotates the valves 5 and 6 alternately place the left end of the vessel in communication with pipe 10 and the right end in communication with pipe 13 and then the left end in communication with pipe 12 and the right end in communication with pipe 11 (as shown in Figs. 2 and 3) so that the steam first flows from the left to right through the vessel 1 and then from right to left and so on, the direction continually alternating. At each alternation the material which has become deposited against the sieves 18, 19 near the end which has just been the exit end is thrown inward by the steam now entering through said sieves at that end and thus the sieves are cleared from time to time.

It may be mentioned that when heating peat, steam at a temperature of 100° C. and a presssure of one atmosphere is preferred.

What I claim is:—

1. An apparatus for heating material comprising a horizontally disposed vessel adapted to revolve on short alined shaft sections, said shaft sections being hollow and in communication with the interior of the vessel, the outer ends of such shaft sections having openings, said openings being disposed on opposite sides of the axis of the vessel, pipes for supplying a heating agent to the vessel, through the shaft sections, and means for revolving the vessel whereby the openings are brought into communication with the pipes for allowing the heating agent to enter the vessel alternately at opposite ends thereof.

2. An apparatus for heating material comprising a horizontal revoluble vessel having an opening in each end thereof, means in communication with the vessel through such openings for delivering a heating agent thereto, and means controlled by the movement of the vessel for automatically causing the heating agent to enter the vessel alternately at opposite ends thereof.

In testimony whereof I have signed my name to this specification in the presence of two subscribing witnesses.

THEODOR FRANKE.

Witnesses:
 OTTO FRANKE,
 HORACE STONEHAM.

Copies of this patent may be obtained for five cents each, by addressing the "Commissioner of Patents, Washington, D. C."